United States Patent [19]

Gluntz

[11] Patent Number: 5,075,074
[45] Date of Patent: * Dec. 24, 1991

[54] STEAM-WATER SEPARATING SYSTEM FOR BOILING WATER NUCLEAR REACTORS

[75] Inventor: Douglas M. Gluntz, San Jose, Calif.

[73] Assignee: General Electric Company, San Jose, Calif.

[*] Notice: The portion of the term of this patent subsequent to Mar. 27, 2007 has been disclaimed.

[21] Appl. No.: 529,820

[22] Filed: May 29, 1990

[51] Int. Cl.5 .............................................. G21C 15/02
[52] U.S. Cl. ...................................... 376/371; 376/373
[58] Field of Search ......................... 376/371, 370, 373

[56] References Cited

U.S. PATENT DOCUMENTS 3,057,333  9/1962  Kuhner ............................. 376/371
4,912,733  3/1990  Gluntz .............................. 376/371

Primary Examiner—Brooks H. Hunt
Assistant Examiner—Frederick H. Voss
Attorney, Agent, or Firm—Robert R. Schroeder

[57] ABSTRACT

An improved separating system for boiling water nuclear reactors comprising a combination of mechanical steam separators with liquid water collecting and transferring devices.

6 Claims, 3 Drawing Sheets

STEAM-WATER SEPARATING SYSTEM FOR BOILING WATER NUCLEAR REACTORS

FIELD OF THE INVENTION

This invention relates to water cooled nuclear fission reactors of the so-called boiling water type. Boiling water nuclear reactors comprise a steam generating plant wherein reactor water coolant is circulated through a core of heat producing fissionable nuclear fuel to transfer thermal energy from the fuel to the coolant, thereby generating a two-phase steam-water mixture at the core. Using steam-water separators and steam dryers positioned downstream from the core, the steam-water mixture flowing out from the fuel core is partitioned into its respective phase whereupon the steam is piped from the reactor for use in steam driven turbines and other equipment, and the liquid water is recirculated back through the fuel core along with make up feed water.

BACKGROUND OF THE INVENTION

In typical boiling water reactors used for power generating operations, reactor coolant is circulated endlessly around a flow path comprised of a core entrance plenum located below the heat producing fuel core, up through the fuel core itself, on through a core upper plenum region located above the fuel core and which serves to collect all the coolant passing through fuel assemblies comprising the core, then on upward through an assembly of steam separators overhead to the separator standpipes external plenum, and finally back downward outside the core, along a region termed the downcomer annulus, to return to the core lower plenum. If the reactor is designed as a natural circulation type boiling water rector, this final flow path outside the core is direct and uninterrupted. A cylindrical member enshrouding the fuel core and extending some distance both above and below the elevations containing the core is positioned between upwardly flowing coolant passing through the reactor core, and downwardly flowing coolant recycling back to the core lower plenum. If the reactor type is a forced circulation reactor, some form of pumping mechanisms are positioned outboard of the core shroud member along this portion of the flow path to amplify the pressure head otherwise present in the core lower plenum region.

The water coolant in such boiling water reactors during their power generating operation exists, at the fuel core entrance, in the form of a subcooled liquid. This subcooled liquid has been produced by mixing, early along the downcomer annulus flow path, two streams: a feedwater stream that has large temperature subcooling relative to reactor operating pressure conditions, and a saturated liquid stream which has been derived by the partitioning, via the assembly of steam separators aided by steam dryers, of two-phase steam vapor-liquid water mixture produced at the exit from the core. The feedwater stream has a mass flow rate that is controlled to match the reactor steam output mass flow rate, so that the coolant inventory and water level within the reactor remain nominally constant. The aforementioned partitioned saturated liquid stream typically has a mass flow rate many times the mass flow rate of the feedwater stream, so that the temperature of the mixed stream arriving in the core lower plenum lies closer to the coolant saturated conditions than to the feedwater entrance conditions.

As the reactor coolant passes through the fuel core, heat is transferred from the fuel assemblies to the circulating coolant. The water coolant emerges from the heat producing fuel core as a two-phase mixture of steam vapor and liquid water, the proportions of which vary depending on such factors as the power output from the fuel, the amount of subcooling present in the feedwater, the total hydrodynamic flow resistance presented by the fuel core design and structure and its wetted surface, and the amount of orificing representing restrictions to flow immediately prior to the entrance of the coolant into the individual core fuel assemblies.

Conventional fuel assemblies of boiling water reactors are composed of a multiplicity of fuel units, such as rod-like containers enclosing fissionable material, grouped together in bundles, with each bundle surrounded by an open ended channel for flow lengthwise therethrough. These channeled bundles of fuel units are spaced apart from each other to provide intermediate spaces for insertion of control blades. Thus, there are ample areas for coolant water bypass flow beyond close proximity to the heat producing fuel units within a bundle.

Bypass flow coolant water passes through the fuel core without closely encountering the high energy emanating from the fuel and enters the core upper plenum consisting substantially of saturated liquid with perhaps a small amount of steam vapor. This bypass effluent joins the two-phase steam-water mixtures exiting from individual fuel assemblies comprising the core. These two effluent streams rapidly mix together within the core upper plenum losing identity from their origin, with the result of a combined overall steam-water mixture containing a significant proportion of water.

Typical boiling water reactors utilize mechanical steam separators to separate steam from the steam-water mixture leaving the fuel core. Some early reactor designs employed free-surface steam separation means where steam separates unaided from the free-surface, and saturated water remains in the bulk coolant which is recirculated back around through the fuel core. This means of steam separation is feasible as long as the steam-leaving velocity—the bulk average velocity of the steam taken across the available pathway flow area—is no greater than about 1.8 feet per second. If steam-leaving velocities become greater than this limiting value, the steam tends to carry along an unacceptable high moisture content. The high moisture levels saturate the moisture-drying capability of the steam dryer whereby there is an excessively high moisture content in the steam leaving the reactor and supplied to a turbine or other steam utilizing mechanism. Such high moisture contents in steam tend to accelerate corrosion/erosion of the turbine blades and other components.

Free-surface separation capabilities can be achieved if the reactor pressure vessel cross-sectional area is made large enough. Cost economics, however, often dictate that minimum diameter pressure vessel be used whereby mechanical steam separators have been developed and employed to handle the higher power output steam production levels of various current boiling water reactor designs. In these latter reactor designs the steam bulk average velocity moving through the wet steam plenum region immediately downstream of the mechanical steam separators is about 5 feet per second.

The steam exit qualities tend to be higher from the central region of the fuel core than from the peripheral region of the fuel core. However, it is desirable that the flow rates and the steam-water mixture proportions entering the steam separator standpipes from the core upper plenum be relatively uniform. To facilitate achieving more uniform steam-water mixtures for entry into the standpipes of the steam-water separators above the fuel core and core upper plenum, the standpipe entrances typically are separated from the fuel assemblies by a distance of at least about 5 feet. Turbulent mixing occurring between the fluid plumes leaving adjacent fuel groups of the core, each with a different void content, comprises one mechanism acting to produce more uniform steam-water mixtures adjacent to the steam separator standpipe entrances. More significant with respect to achieving uniformity of flow mixture, is the hydrodynamic flow resistance represented by the standpipes each with their end-mounted steam separators. Complete flow mixture uniformity entering the steam separator standpipes is at best difficult to achieve and, even with a five foot separation between the fuel core assembly exits and the separator standpipe entrances, is not a design basis used for reactor performance evaluations.

A conventional boiling water reactor steam separator assembly consists of a domed or flat-head plate topping the core upper plenum which is superimposed over the fuel core. An array of steam separator standpipes are affixed such as by welding to the core upper plenum top plate with the standpipes in fluid communication with the interior of the core upper plenum. A mechanical steam separator, such as a three stage centrifugal axial flow separator, is mounted on the other and upper end of the standpipe affixed to the top plate.

One function of the standpipes is to provide a standoff separation of the larger-diameter steam separators, which are generally arranged in a relatively tightly compacted arrangement in which external diameters of adjacent separators are almost in contact with each other, whereby separated liquid coolant discharged from the bottom of the separator has a more open flowpath outward from the reactor longitudinal axis and out to the downcomer annulus region which lies at the inboard periphery of the reactor pressure vessel. A second reason for the standpipes on a high power output natural circulation reactor using mechanical steam separators is to provide a natural circulation "chimney" of two-phase (and thus low-density) coolant water wherein the chimney height provides part of the natural-circulation driving head for coolant water flow circulation within the reactor.

The steam separator assembly is supported by a flange at the top of the core shroud. The flange joint between the steam separator assembly and the core shroud is a metal-to-metal contact and does not require a gasket or other sealing devices requiring service or replacement. Moreover, the fixed axial flow type steam separators are constructed of stainless steel and have no moving parts whereby they are maintenance free.

In each separator, the steam-water mixture rises up from the core upper plenum through the standpipe into the separator unit where it impinges upon helical vanes that give the steam-water mixture a spinning movement establishing a vortex whereby centrifugal forces separate the denser water from the steam in several successive stages. Wet steam leaves the separator at the top and then passes out into the wet steam plenum located immediately above the steam separator assembly. An assembly of steam dryers is superimposed centrally above or in an annular configuration above the steam separator assembly. Wet steam passes through the dryers, where most of the moisture component in the entrance flow is removed and drained back to the downcomer annulus liquid, while the dry steam is ducted to the reactor steam outlet nozzles.

The separator water exits from the lower end of each stage of the separator and enters the underlying pool that surrounds the standpipes joining the downcomer annulus flow of reactor subcooled coolant. The steam exits from the separators can either be all in the same horizontal plane, or the separator units can be arranged with their tops in a convex crown with a higher center to compensate for a convex crowned water gradient to the underlying pool surrounding the standpipes.

The mechanical separator has certain principal performance requirements; namely, over a range of approximately 30 inches of water level variation about the midplane of the separator units housing, and over a range of reactor power operating conditions from about 25% up to and slightly exceeding 100% the steam separator is required to deliver wet steam into the wet steam plenum with moisture contents generally not to exceed 10% by weight of the wet steam effluent, and to deliver water out the bottom of the stages of the unit stripped of steam to the extent that bulk average steam carryunder generally does not exceed 0.25% by weight of effluent.

The nominal volumetric envelope of the steam separator assembly is defined by the horizontal plane of its lower terminal that contacts the top of the core shroud, its peripheral sides that provide part of the five foot standoff from the fuel core assembly exits, the circumscribed diameter of the outermost row of the standpipes, and the generally horizontal plane of the exits to the steam separators.

At rated operated conditions with such mechanical steam separators the pressure drop from the core upper plenum to the wet steam plenum at the separator exit below the overhead steam dryer assembly is about 6.7 pounds per square inch of irreversible head losses (friction, form drag and exhaust losses).

Irreversible head losses anywhere along the reactor coolant circulation path are penalizing to the efficiency of operation of the reactor pressure vessel and/or the overall nuclear steam supply system. For natural circulation boiling water reactors, irreversible head loss means greater chimney height has to be provided, which means the reactor pressure vessel probably has to be made larger, namely taller, and therefore more costly. Also the reactor containment building and probably other components would need be made larger contributing to greater costs.

In forced circulation boiling water reactors irreversible head loss would require greater pumping power to accomplish core recirculation flow, and in turn greater capital and greater operational costs for the pumping system and thus poorer net plant heat rate.

SUMMARY OF THE INVENTION

This invention comprises an improved steam-water separating device and system for boiling water nuclear reactors. The invention includes a novel combination of conventional standpipes with mechanical steam separators and an open top water collection chamber(s) located within the core upper plenum with a bottom venting drain pipe extending out to the annular coolant flow path intermediate the pressure vessel and fuel core. Water accumulates in the open top collection chamber(s), separating itself from the two-phase steam-water mixture within the core upper plenum attributable to the phenomenon of free-surface separation.

OBJECTS OF THE INVENTION

It is a primary object of this invention to provide an improved steam-water separating means for boiling water nuclear reactors.

It is also an object of this invention to provide an improved configuration and system for boiling water nuclear reactors which yield reduced irreversible coolant water circulation flow losses within the reactor pressure vessel.

It is a further object of this invention to provide a boiling water nuclear reactor internal configuration or design which is more compact in size, or handles a greater volume of steam/water coolant in steam production.

It is an additional object of this invention to provide a boiling water nuclear reactor internal configuration or design which enables more effective steam production whereby overall construction and operation costs are reduced.

DETAILED DESCRIPTION OF THE INVENTION

This invention deals with an added device to the conventional boiling water reactor steam-water separating means which enhances the existing mechanical steam separation capability of the system.

Figure 1:
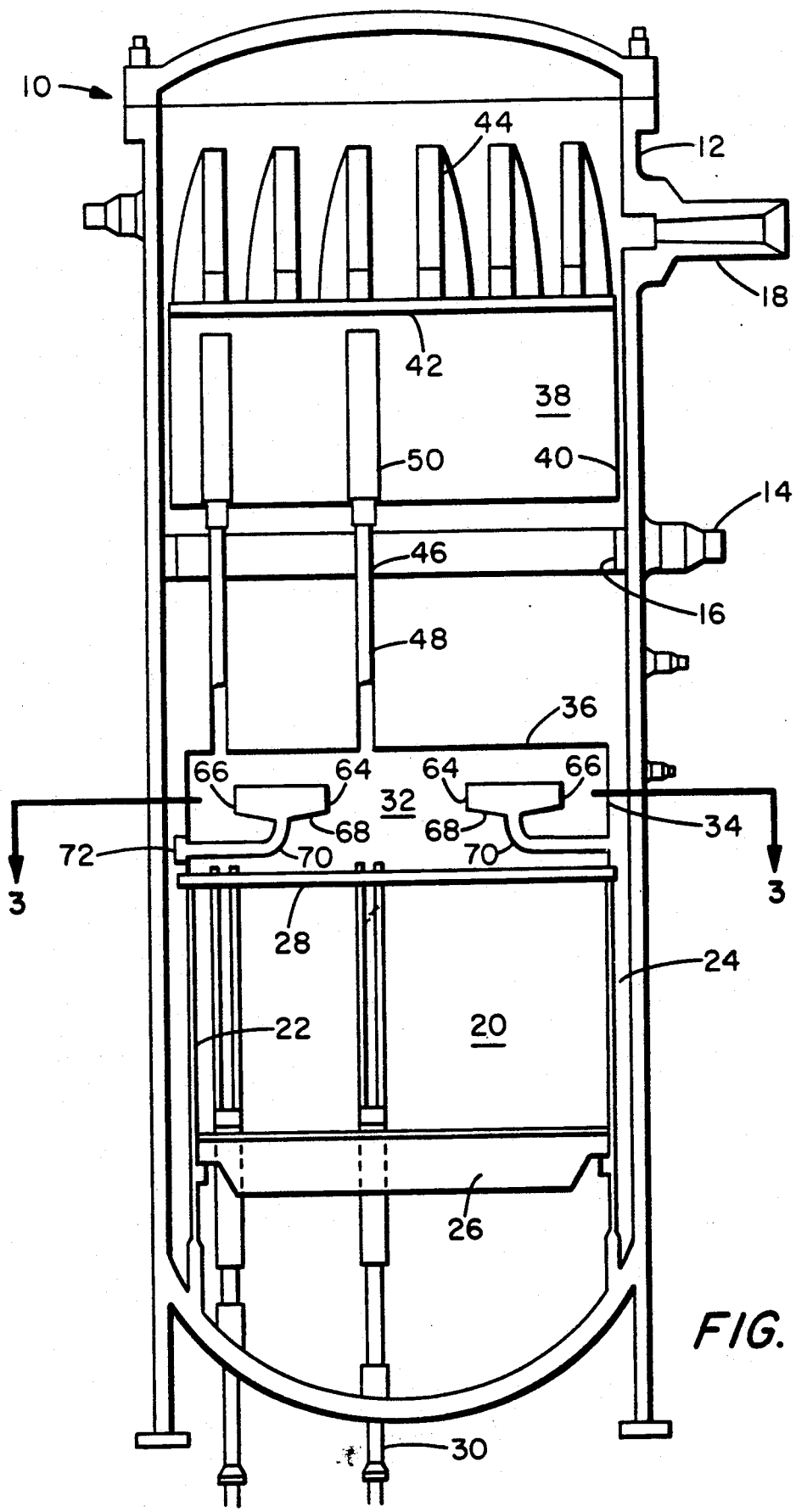
FIG. 1 comprises a vertical sectional view of a boiling water nuclear reactor pressure vessel with part in elevation.

Referring to the drawings, in particular FIG. 1, a boiling water nuclear fission reactor 10 comprises a reactor pressure vessel 12 having feed-water inlet 14 for the introduction of a portion of the recirculating coolant into the pressure vessel 12 through an annular distributor 16, and a steam outlet 18 for the discharge of generated steam for appropriate work.

A core of heat generating fissionable fuel 20 is located within the pressure vessel 12, generally intermediate its length and is surrounded by a shroud 22 spaced inward from the wall of the pressure vessel to provide an annular coolant flow path 24 intermediate the pressure vessel wall and the shroud 22 for the fuel core 20. The fuel core 20 composed of a plurality of fuel units is supported on an underlying core support grid plate 26 and the upper portion of the fuel units of the core 20 are held in position with top spacing grid plate 28. Control rods 30 containing neutron absorbent material, which regulate the rate of the nuclear fission reaction of the fuel in the core 20, move upward into the arrayed fuel bundles of the core 20 and back downward out from the core.

Superimposed above the fuel core 20 and the top spacer grid plate 28, is an open area comprising the fuel core upper plenum 32 defined by a circular shroud 34 and top plate 36. Shroud 34 is spaced inward from the wall of the pressure vessel to provide for the annular coolant flow path 24 intermediate the pressure vessel wall and the shroud 34 of the core upper plenum 32.

Spaced a distance above the fuel core 20 and the superimposed core upper plenum 32, is an area comprising the wet steam plenum 38 defined by a circular shroud 40 and a top plate 42. A steam dryer assembly 44 is superimposed above the wet steam plenum 38 and its top plate 42.

A multiplicity of mechanical steam-water separators 46 each comprising a standpipe 48 with a steam separator assembly 50 mounted on its upper end, are arranged in close proximity to each other within the area intermediate the core upper plenum 32 and the steam dryer assembly 44. The lower end of separator standpipe 48 is fixed to the top plate 36 of the core upper plenum 32, such as by welding. Each standpipe 48 is in fluid communication with the core upper plenum 32 whereby steam-water mixtures within the plenum area can enter the standpipes and rise up into the steam separator assembly 50 mounted thereon.

Figure 2:
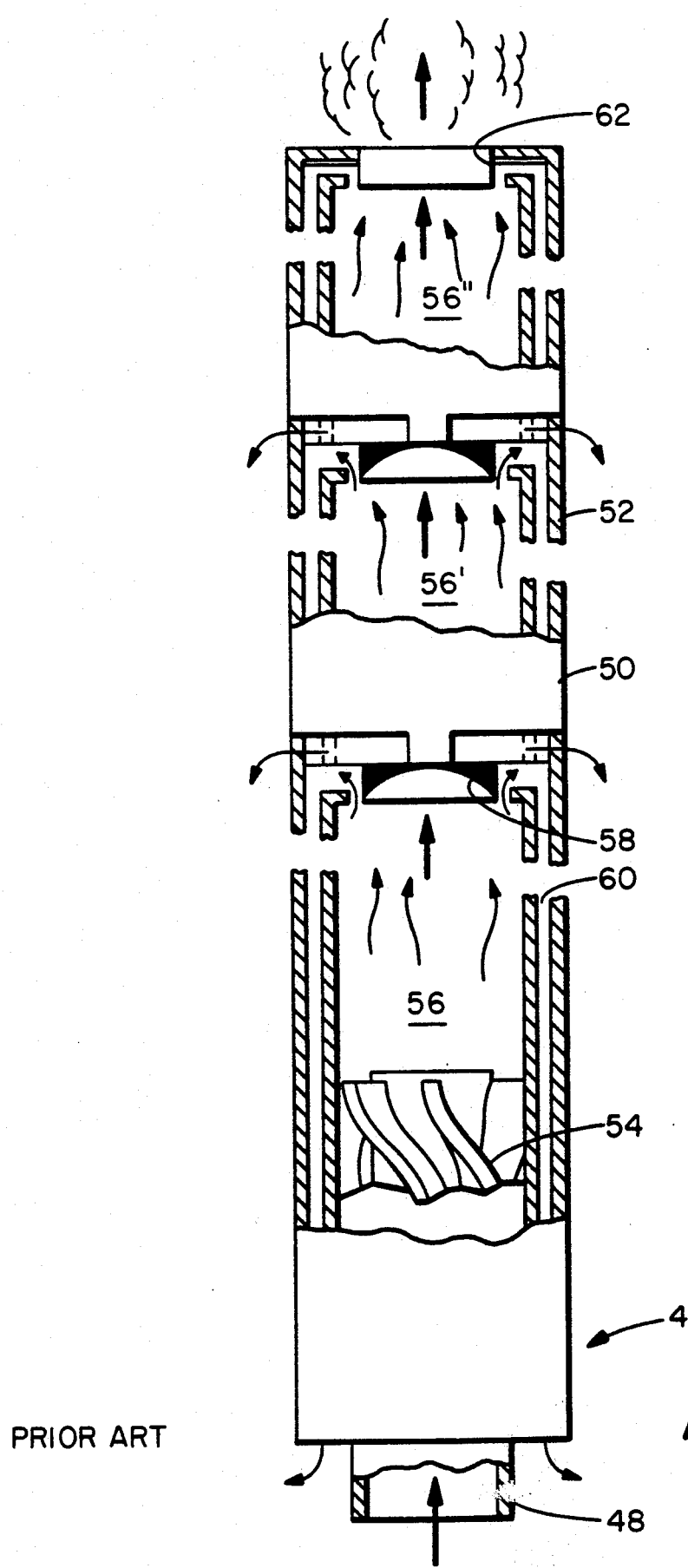
FIG. 2 is a detailed, enlarged sectional view, with parts in elevation, of a mechanical steam-water separator of the prior art.
Figure 3:
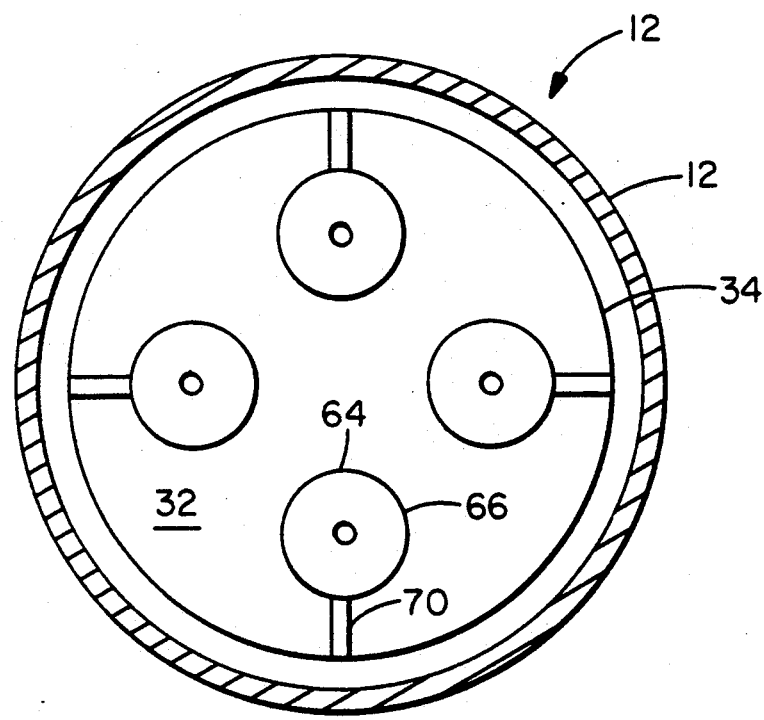
FIG. 3 is a cross-section view of FIG. 1 along the line 3—3.

As shown in FIG. 2, steam separator assembly 50 comprises a cylindrical housing 52 positioned within the wet steam plenum 38 and secured to the upper end of each standpipe 48 for receiving the steam-water mixture thorough its standpipe 48 from the core upper plenum 32. A typical steam separator assembly 50 comprises helical vanes 54 in the base of the housing 52 adjoining the upper end of standpipe 48 to induce a swirling movement to the steam-water mixture rising up into the assembly 50 from its standpipe 48. The centrifugal effect of the swirling mixture causes the heavier liquid water to move laterally outward while the lighter gaseous steam continues its upward movement centrally through the assembly 50. The steam separator assembly housing 52 is also divided into several superimposed compartments 56 which are separated with convex diverters 58 and provided with side outlets 60 to facilitate the centrifugal separation and enable lateral as well as downward discharge of the liquid water. A top central steam outlet 62 is located in upper end of the housing 52 for discharge of the separated steam therefrom adjacent to the top plate 42 of the wet steam plenum 38.

As is apparent, feedwater coolant enters the pressure vessel 12 through inlet 14 and is distributed around the periphery of the vessel by the annular distributor 16 whereupon it becomes mixed with separated liquid water emerging through side outlets 60. The annular flow of recirculating coolant comprising feedwater and separated liquid water passes down around the reactor through the flow path 24 intermediate the vessel wall and the shrouds of the core upper plenum and fuel core to the area below the fuel core support plate 26. The recirculation coolant flow then travels upward through the heat generating core of fuel producing a mixture of steam and hot water which emerges into the core upper plenum 32. The steam-water mixture continues upward from this plenum through the standpipes 48 and into mechanical steam separators 50 where the separated water emerging through side outlets 60 is discharged downwardly for repeating the recycling through the system and the separated steam continues upward through the steam dryers and on to its designated service.

In accordance with this invention, one or more liquid water collecting and transferring devices is combined with the steam-water separating assemblies 46 of the above described boiling water nuclear reactor system.

The liquid water collecting and transferring device(s) of this combination comprises one or more open top water collecting chamber(s) 64 located within the core upper plenum 32 to receive the steam-water mixture emanating from the fuel core 20. Liquid water collecting chamber 64 comprises side wall 66 of any apt cross-section such as cylindrical, and bottom wall 68 which preferably is sloped downward or conical shaped. The top of the liquid water collecting chamber 64 is open to receive liquid from the upward flow of steam-water mixtures. Extending from the bottom, or low point of the bottom wall 68 of chamber 64 is a drain conduit 70 which passes through the shroud 34 of the core upper plenum 32 and makes fluid contact with the annular coolant flow path 24 for recirculating liquid coolant water through the reactor system. An additional option comprises a diffuser 72 on the upper exit end of the drain conduit 70 to enable the diameter of the drain conduit to be smaller while producing equivalent irreversible pressure drop at the same stream flow rates.

In operation, liquid water from the steam-water mixture emanating from the fuel core 20 into the core upper plenum 32, will separate by means of the free-surface steam separation phenomenon and collect in the open top water collecting chamber 64. As the liquid water collects within the chamber it will flow downward into and through drain conduit 70 whereupon it is discharged out in the annular coolant flow path 24 for recirculation with the feed water back through the fuel core 20.

The overall flow loss coefficient of the drain conduit 70, together with the reference flow area of the drain conduit, is such as to limit the water throughput rate to less than a prescribed value. Liquid water collects in the open-top collecting chamber 64, separating itself from the two-phase steam vapor-liquid water mixture in the core upper plenum 32 by the free-surface separation process. The drain conduit flow-coefficient-and-flow-area combination lower limit is based on the collection area of the liquid water collecting chamber 64, and is such that the operating pressure differential across the drain conduit 70 will pass water only at rates required to assure nonexceedance of steam vapor carryunder limits.

In operation of this invention, the steam vapor-liquid water mixture exiting from the fuel core 20 will flow across/over/into the open-top liquid water collecting chamber(s) 64 to replenish the volume of water being expelled or drained out through the drain conduit 70. The driving force accomplishing this expulsion or drawing is the higher static pressure existing within the fuel core upper plenum 32 relative to the annular coolant flow path 24. The drain rate from the collecting chamber(s) 64 is such as to maintain the downwardly-moving volumetric flow rate—taken as all liquid—at below 1.0 feet per second, approximately. This assures that any bubbles of steam vapor present in the mixture within the chamber near to its upper open top can rise through the downward flowing liquid water to "separate", namely flow back up into the region above the open top collecting chamber 64, leaving only liquid water free of steam vapor being removed through the drain conduit 70.

The drain conduit 70 is sized, relative to the open-top area of the collecting chamber 64, so that the volumetric flow rate of water out through the drain conduit 70 does not exceed the foregoing described water collecting chamber 64 flow rate limit. This limit thus maintains the steam vapor/liquid water separation process at the upper area of the water collecting chamber(s) 64 as a free-surface process in which the steam vapor carryunder content is not excessive.

Because large mass flow rates of water can be vented from the fuel core upper plenum 32 out into the annular coolant flow path 24 by means of one or more of the novel open-top collecting chambers 64, the volumetric flow burden on the standard complement of mechanical steam separators 50 is reduced. As a result of this reduced volumetric burden the overall irreversible pressure drop across the standpipes 48 and separators 46 will be reduced. This unique combination of components of the existing separators with the device of this invention provides an effectively larger flow are without adding any impediments or negatively affecting the existing envelope within which the novel device of the invention resides within the reactor vessel.

What is claimed is:

1. A boiling water nuclear fission reactor having an improved steam-water separating system, consisting essentially of the combination of a reactor pressure vessel having an inlet for supplying coolant feedwater and a steam outlet and containing a core of fissionable fuel for producing heat to generate steam, said fuel core being mounted between a discontinuous core support plate and a top spacing grid plate and surrounded by a shroud which is spaced inward away from the pressure vessel to provide an annular flow channel outside the fuel core shroud whereby supplied coolant feedwater from the inlet along with recirculating liquid coolant water can flow together downward around the exterior of the fuel core shroud and then around back upward through the shroud surrounding heat producing fuel core for the transfer of thermal energy therefrom to the coolant water flowing therethrough and generation of steam, a fuel core upper plenum superimposed above the fuel core defined by a peripheral shroud which extends up from the fuel core shroud and covered with a top plate for receiving hot liquid water and steam from the heat producing fuel core, a wet steam plenum spaced a distance above the core upper plenum, a steam separator assembly comprised of a multiplicity of mechanical steam separators affixed to the fuel core upper plenum covering top plate, each of the said steam separators comprising a standpipe fixed to the top plate of the core upper plenum with an open lower end in fluid communication with the fuel core upper plenum and extending upward from said fuel core upper plenum covering top plate to the wet steam plenum and having a steam separating assembly mounted on their upper end within the wet steam plenum, spaced a distance above the core upper plenum, and having at least one steam separating unit comprising an open-top water collecting chamber located within the fuel core upper plenum enclosed by the peripheral shroud and covering top plate and having a drain conduit extending down from a lower portion of said open-top water collecting chamber which extends out through the peripheral shroud defining the fuel core upper plenum from discharging into the annular flow channel outside of the shroud defining the fuel core upper plenum and surrounding the fuel core.

2. The boiling water nuclear fission reactor of claim 1, wherein a multiplicity of open-top water collecting chambers with drain conduits are dispersed throughout the fuel core upper plenum.

3. The boiling water nuclear fission reactor of claim 1, wherein the reactor pressure vessel is cylindrical in cross-section and the shroud surrounding the fuel core and shroud defining the fuel core upper plenum are cylindrical in cross-section and of smaller diameter than the reactor pressure vessel.

4. The boiling water nuclear fission reactor of claim 1, wherein the drain conduit is provided with a diffuser at its end discharging into the annular flow channel outside of the shroud defining the fuel core upper plenum and surrounding the fuel core.

5. A boiling water nuclear fission reactor having an improved steam-water separating system, consisting essentially of the combination of a cylindrical reactor pressure vessel having an inlet for supplying coolant feedwater and a steam outlet and containing a core of fissionable fuel for producing heat to generate steam, said fuel core being mounted between a discontinuous fuel core support plate and a top spacing grid plate and surrounded by a cylindrical shroud which is of smaller diameter and spaced inward away from the cylindrical reactor pressure vessel to provide an annular flow channel intermediate the reactor pressure vessel and the fuel core shroud whereby supplied coolant feedwater along with recirculating liquid coolant water can flow together downward through the annular flow channel exterior of the fuel core shroud and then around the fuel core shroud and upward into the shroud and through the heat producing fuel core for the transfer of thermal energy therefrom to the coolant water passing therethrough and generating steam, a fuel core upper plenum superimposed above the fuel core defined by a cylindrical peripheral shroud of smaller diameter and spaced inward away from the cylindrical reactor pressure vessel which extends up from the fuel core shroud and covered with a top plate for receiving hot liquid water and steam emerging from the heat producing fuel core, a wet steam plenum spaced a distance above the core upper plenum, a steam separator assembly comprised of a multiplicity of mechanical steam separators affixed to the fuel core plenum covering top plate, each of the said steams separators comprising a standpipe fixed to the covering top plate of the core upper plenum with an open lower end in fluid communication with the fuel core upper plenum and extending upward from said fuel core upper plenum covering top plate to the wet steam plenum and having a steam separating assembly mounted on their upper end within the wet steam plenum spaced a distance above the core upper plenum, and having at least one steam separating unit comprising an open-top water collecting chamber located within the fuel core upper plenum surrounded by the cylindrical peripheral shroud and the covering top plate and having a drain conduit extending down from a lower portion of said open-top water collecting chamber which extends out through the cylindrical peripheral shroud defining the fuel core upper plenum for discharging into the annular flow channel outside of the cylindrical shroud defining the fuel core upper plenum and surrounding the fuel core.

6. The boiling water nuclear fission reactor of claim 5, wherein the drain conduit is provided with a diffuser at its end discharging into the annular flow channel intermediate the reactor pressure vessel and the fuel core shroud.

* * * * *